Aug. 20, 1935.                    C. R. PITRE                    2,011,591
                              GASOLINE ENGINE
                           Filed July 6, 1932              2 Sheets-Sheet 2
Fig-2-    Fig-3-
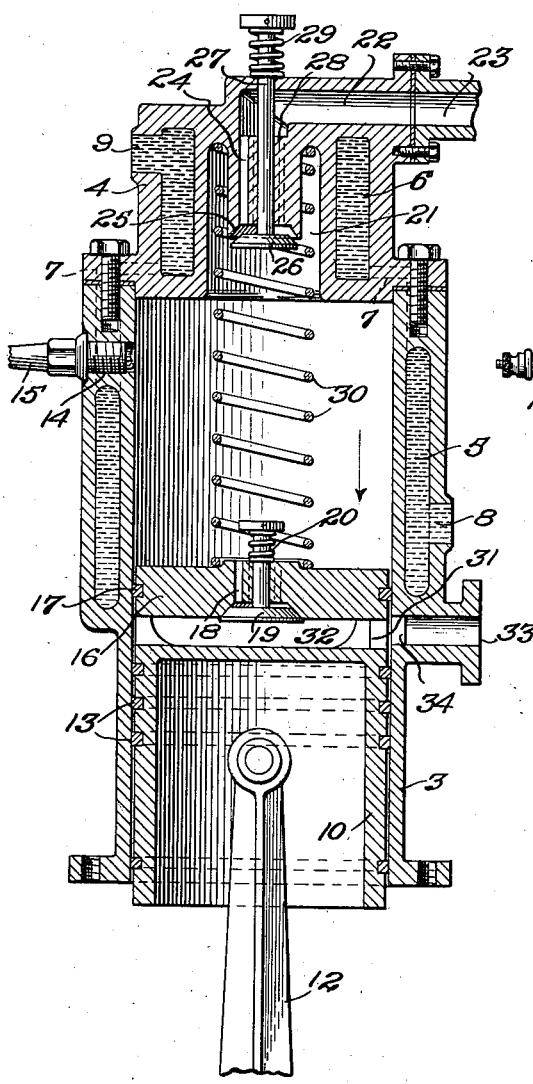
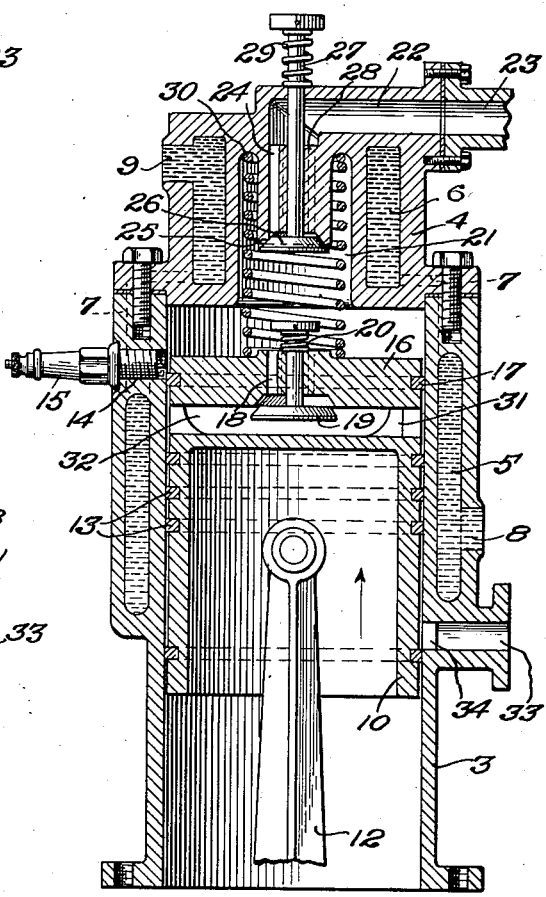
Camille R. Pitre,
INVENTOR
BY Victor J. Evans & Co.
ATTORNEY
WITNESS:

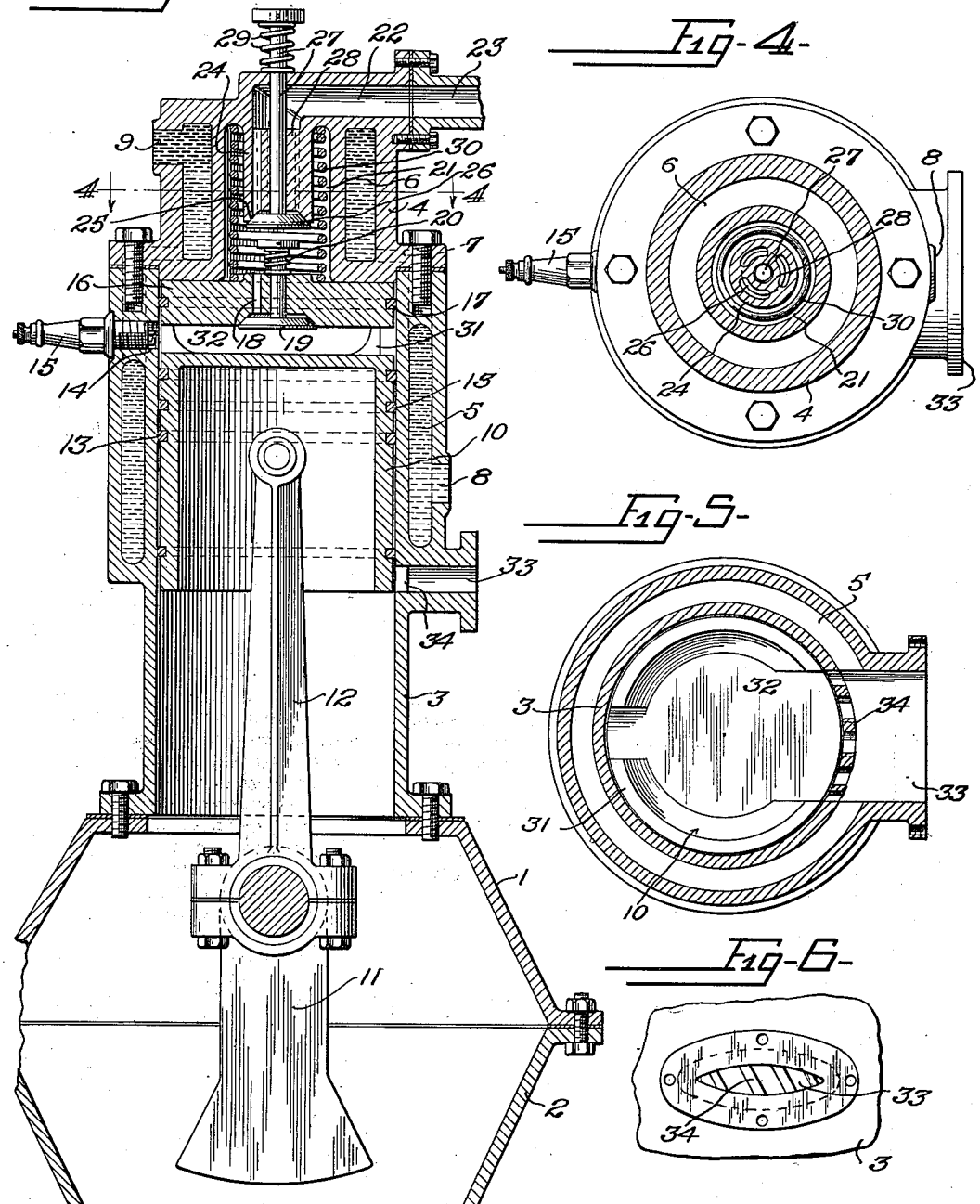

Patented Aug. 20, 1935

2,011,591

UNITED STATES PATENT OFFICE 2,011,591

GASOLINE ENGINE

Camille R. Pitre, New Orleans, La.

Application July 6, 1932, Serial No. 621,095

1 Claim. (Cl. 123—66)

This invention relates to internal combustion engines of the two cycle type capable of developing maximum power and high speeds with a low consumption of fuel and has for the primary object, the provision of a valved follower between the piston of the engine and the fuel delivery chamber and adapted to provide between the piston and itself a firing chamber and to follow the piston on its downward or power stroke to aid in scavenging the cylinder of burnt gases and simultaneously draw fuel into the delivery chamber and to be returned upwardly in the cylinder by the upward stroke of the piston and simultaneously admit fuel from the delivery chamber to the firing chamber between said piston and the follower.

With this and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating an internal combustion engine constructed in accordance with my invention.

Figure 2 is a fragmentary vertical sectional view showing the piston and follower in their lowermost position and exhausting the burnt gases from the cylinder and simultaneously drawing fuel into the delivery chamber.

Figure 3 is a similar view showing the piston and follower on their upward stroke to receive fuel in the firing chamber from the delivery chamber.

Figure 4 is a sectional view taken on the line 4—4 of Figure 1.

Figure 5 is a sectional view illustrating the exhaust port.

Figure 6 is a fragmentary side elevation showing a screen for the exhaust port.

Referring in detail to the drawings, the numeral 1 indicates a base having the usual removable crankcase 2. A cylinder 3 is detachably secured to the base having communication with the interior thereof and is provided with a removable head 4. The cylinder and head are provided with water jackets 5 and 6 communicative by passages 7. The water jacket 5 is provided with a water inlet 8 while the jacket 6 is provided with an outlet 9.

A piston 10 is reciprocally mounted in the cylinder and is connected to a crank shaft 11 journalled in the base 1 by a connecting rod 12. The piston is provided with packing rings 13 between itself and the walls of the cylinder. The cylinder adjacent its upper end is provided with a port 14 to receive a spark plug 15. A follower 16 is slidably mounted in the cylinder between the piston 10 and the head 7 and is provided with a packing ring 17 to engage the walls of the cylinder and is also provided with a series of ports 18 controlled by a valve 19 slidably mounted in the follower and normally held in a seated position by a spring 20. The head 4 has formed therein a fuel delivery chamber 21 communicative with the cylinder and with an intake manifold 22 and the latter is connected to an intake manifold 23 of conventional type adapted for connection with a carburetor. The fuel passage 22 depends some distance downwardly into the delivery chamber 21 as shown in the drawings in the form of a sleeve 24, the lower end of which is shaped to form a valve seat 25 engaged by a valve 26. The valve 26 is provided with a stem 27 slidable through a web 28 in the sleeve 24 and also through an opening in the fuel passage 22 and has mounted thereon a spring 29 to normally seat the valve 25. A coiled spring 30 is mounted in the fuel delivery chamber and bears against the follower 16.

The cylinder 3 is provided with an exhaust port 33 located at such a point in the cylinder that the burnt gases in the latter may exhaust when the piston is in its lowermost position as shown in Figure 2. A slotted bridge 34 is located in the exhaust port 33 to prevent the packing rings 13 of the piston from expanding into the exhaust port during the movement of the packing rings by the exhaust port during the reciprocation of the piston 10.

In operation, fuel within the firing chamber 32 with the piston and follower in their uppermost position is ignited by the spark plug 15 and the expansion of the fuel drives the piston downwardly and as the pressure of the expanding gases reduces, the follower 16 moves downwardly under the influence of the spring 30 and as the piston reaches its lowermost position the burnt gases escape by the exhaust port 33 and are aided in their escape by the downward movement of the follower. The downward movement of the follower draws fuel from the fuel passage 22 into the upper portion of the cylinder as shown in Figure 2. The upward stroke of the piston causes an upward movement of the follower compressing the fuel within the fuel delivery chamber and as this pressure increases it unseats the valve 19 allowing the fuel to enter the space between the follower and the piston ready to be ignited by the spark plug when the piston and follower reach their uppermost position within the cylinder. During the upward movement of the follower by the action of the piston, the spring 29 seats the valve 26.

An annular member 31 is formed on the top of the piston and has opposite sides thereof cut away and is adapted to space the follower 16 from the piston for the purpose of forming a firing chamber 32.

While the foregoing description sets forth an engine of a single cylinder type it is to be understood that the engine may be constructed with any number of cylinders.

While I have shown and described the preferred embodiment of my invention, it will be understood that minor changes in construction, combination and arrangement of parts may be made without departing from the spirit and scope of my invention, as claimed.

Having thus described my invention, what I claim is:

An engine including a base supporting a crank shaft and an open ended cylinder having an exhaust port intermediate the ends thereof, a piston slidable in the cylinder and adapted when in one position to uncover the exhaust port, a flanged portion on the piston and having cutaway parts to aline with the exhaust port during the stated position of the piston, means connecting the piston to the crank shaft, a head closing the cylinder and having a chamber and a fuel passage communicating with and extending into the chamber and forming a spring seat, a suction operated valve carried by the head for opening and closing the fuel passage to said chamber, a follower in the cylinder between the head and the piston and having a port and adapted to follow the movements of the piston, a pressure operated valve for the last-named port, a coil spring having one end engaging the seat and its opposite end engaging the follower to cause the latter to move into engagement with the flanged portion of the piston during the uncovering of the exhaust port by the piston, and ignition means to ignite the fuel between the follower and the piston.

CAMILLE R. PITRE.